(12) United States Patent
Arumugam

(10) Patent No.: US 11,741,471 B2
(45) Date of Patent: *Aug. 29, 2023

(54) SYSTEMS AND METHODS FOR STREAMLINED CHECKOUT

(71) Applicant: JPMorgan Chase Bank, N.A., New York, NY (US)

(72) Inventor: Avin Arumugam, San Francisco, CA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 47 days.

This patent is subject to a terminal disclaimer.

(21) Appl. No.: 17/386,652

(22) Filed: Jul. 28, 2021

(65) Prior Publication Data

US 2021/0357938 A1 Nov. 18, 2021

Related U.S. Application Data

(60) Continuation of application No. 16/839,618, filed on Apr. 3, 2020, now Pat. No. 11,107,081, which is a
(Continued)

(51) Int. Cl.
| | |
|---|---|
| *G06Q 20/20* | (2012.01) |
| *G06Q 20/40* | (2012.01) |
| *G06Q 20/32* | (2012.01) |
| *G06Q 20/36* | (2012.01) |
| *G06Q 20/38* | (2012.01) |
| *G06Q 10/063* | (2023.01) |

(52) U.S. Cl.
CPC ....... *G06Q 20/4014* (2013.01); *G06Q 10/063* (2013.01); *G06Q 20/20* (2013.01); *G06Q 20/3224* (2013.01); *G06Q 20/363* (2013.01); *G06Q 20/385* (2013.01); *G06Q 20/40145* (2013.01)

(58) Field of Classification Search
CPC .. G06Q 10/063; G06Q 20/20; G06Q 20/3274; G06Q 20/40; Y04S 10/54
See application file for complete search history.

(56) References Cited

U.S. PATENT DOCUMENTS

| | | |
|---|---|---|
| 7,870,202 B2 | 1/2011 | Madams et al. |
| 9,195,984 B1 | 11/2015 | Spector et al. |
| (Continued) | | |

OTHER PUBLICATIONS

Unknown, Vendors Capitalize on Homeland Security Focus, Jul. 14, 2003, Communications Today; Access Intelligence, LLC.

*Primary Examiner* — Scott S Trotter
(74) *Attorney, Agent, or Firm* — GREENBLUM & BERNSTEIN, P.L.C.

(57) ABSTRACT

Embodiments of the present invention are directed to a "one-click payment" scheme for streamlining customers' online checkout experiences. According to one particular embodiment, a customer can use a computing device to be authenticated and receive a unique, one-time token to make a one-click payment during an online checkout process. The one-time token may be encrypted and directly associated with a payment account which the customer is authorized to access. The online merchant may forward a transaction request including the one-time token and purchase amount to an authorization server which would verify the token and charge the corresponding payment account.

20 Claims, 7 Drawing Sheets

Related U.S. Application Data division of application No. 14/603,479, filed on Jan. 23, 2015, now Pat. No. 10,657,531.

(60) Provisional application No. 61/930,992, filed on Jan. 24, 2014.

(56) References Cited

U.S. PATENT DOCUMENTS

| | | |
|---|---|---|
| 2007/0250920 A1 | 10/2007 | Lindsay |
| 2013/0204793 A1 | 8/2013 | Kerridge et al. |
| 2013/0218765 A1 | 8/2013 | Hammad et al. |
| 2014/0164254 A1 | 6/2014 | Dimmick |
| 2015/0046276 A1 | 2/2015 | Artman et al. |
| 2015/0073987 A1 | 3/2015 | Dutt |

SYSTEMS AND METHODS FOR STREAMLINED CHECKOUT

CROSS-REFERENCE TO RELATED APPLICATIONS

This application is a continuation of U.S. patent application Ser. No. 16/1839,618, filed Apr. 3, 2020, now U.S. Pat. No. 11,107,081, which is a division of U.S. patent application Ser. No. 14/603,479, filed. Jan. 23, 2015, now U.S. Pat. No. 10,657,531, which claims the benefit of U.S. Provisional Application No. 61/930,992, filed Jan. 24, 2014. The entire disclosure of each of the above-identified applications, including the specification, drawings, and claims, is incorporated herein by reference in its entirety.

TECHNICAL FIELD

Embodiments of the present invention are related generally to systems and methods for authenticating a customer attempting to access a financial account or conduct a financial transaction, and, more particularly, to techniques for authenticating a customer in streamlined and secure manner.

BACKGROUND OF THE INVENTION

Customer authentication (i.e., confirming the identity of the customer) is critical for most financial transactions such as purchases with payment cards and automated teller machine (ATM) withdrawals.

Conventional customer authentication schemes typically rely on one or both of two authentication factors; a possession factor and a knowledge factor. The possession factor refers to "something only the customer has," such as a unique debit card, credit card, smart card, or token device (e.g., Exxon® Speedpass™). The knowledge factor refers to "something only the customer knows," such as a password or personal identification number (PIN).

FIG. 1 illustrates typical prior methods of customer authentication for payment card based transactions. For example, in most card-present credit card purchases, the cardholders become authenticated simply by swiping their credit cards, which is a type of single-factor authentication based on the possession factor. In contrast, online purchases are typically card-not-present (CNP) transactions where the authentication also relies heavily on the knowledge factor: the customer has to supply both payment card information (e.g., cardholder name, card number and expiration date, which is presumably only known to the person possessing the physical card) and billing information (e.g., billing address and telephone number associated with the card, which is presumably only known to the legitimate cardholder). A typical ATM transaction utilizes a two-factor authentication where the cardholder not only has to insert or swipe a credit or debit card (something only the cardholder is supposed to have) but also has to enter a correct PIN code (something only the cardholder is supposed to know).

However, a number of deficiencies still exist with the conventional customer authentication and checkout processes. While the single-factor authentication in card-present transactions seems straightforward, that approach is both insecure (as a payment card can be lost or stolen and then subject to unauthorized uses, or the card swiped could be a counterfeit card—an exact replica of the authentic card) and inconvenient (since the cardholder must carry the card and present it at the point of sale). As to the two-factor authentication approaches, the cardholder is required to either carry the card (e.g., in an ATM transaction) or at least memorize the card information (e.g., for online purchases), and the additional information supplied for authentication purpose may be too hard for the cardholder to memorize (in the case of unique PINs or passwords) or too easy for others to obtain (in the case of addresses, telephone numbers, or re-used PINs or passwords), not to mention the inconvenience of having to supply the additional information for each transaction. In general, there has been a trade-off between security and convenience/efficiency: the more secure an authentication method, the more information the cardholder is required to supply, or figuratively speaking, the more hoops the customer has to jump through.

One notable prior authentication approach is the one adopted by Europay, MasterCard and Visa (EMV) which implemented a global standard for inter-operation of integrated circuit cards (IC cards, a.k.a. "smart cards" or "chip cards") and IC-card-capable POS terminals and ATMs for authenticating credit and debit card transactions. For customer authentication, the EMV standard requires the reading of a smart card and the correct entry of a PIN passcode, which is essentially a two-factor authentication scheme similar to traditional ATM transactions. Apparently, the EMV standard is only useful for card present transactions (thus inapplicable to online purchases) and also not free from some of the deficiencies described above.

By focusing on the knowledge factor and/or the possession factor, the prior authentication methods often fail to take advantage of a more powerful authentication factor, the inherence factor, which basically refers to and takes advantage of "something only the user is" such as biometric characteristics (e.g., fingerprint, voice signature, and retinal pattern). Fundamentally, the inherence factor such as biometric characteristics should more reliably confirm the identity of a person than the knowledge factor and/or possession factor. Biometric techniques such as fingerprint scanning have existed for a while now, but they have not been widely or effectively applied to customer authentication in the context of card transactions or personal banking.

Also, the heavy reliance upon the knowledge factor tends to impose a significant burden upon cardholders during checkout processes. Although some online stores such as Amazon.com have promoted "1-Click Ordering" processes, those are not true or ideal one-click checkout experience as the customers still have to go through a two-factor authentication (by entering a username and a password) which has some known security defects.

Another problem with conventional checkout processes is that they are monolithic and inflexible. Prior systems typically apply authentication policies that do not differentiate between types of transactions, accounts, or account holders, thereby failing to account for potential risk levels of different transactions. As a result, the same authentication policy is uniformly applied regardless of the type of interaction or channel, even though some interactions are much riskier than others. For example, the same procedure of card-swiping and/or PIN-entry could be followed whether the purchase is for a $1 chewing gum or a $5,000 plasma TV. Nor do the customers typically have any say in the authentication method during checkout.

Furthermore, there is a wealth of other types of information (e.g., location, behavioral history) that can supplement and/or enhance the effectiveness of customer authentication but have not been fully exploited.

Other problems and drawbacks also exist in prior customer authentication and checkout methods.

BRIEF SUMMARY OF THE INVENTION

Embodiments of the present invention are directed to improved techniques for authenticating customers and streamlining their checkout experiences which overcome at least some of the above-mentioned problems and drawbacks in the prior art.

One object of the present invention is to streamline online checkout processes through one-click payments.

Another object of the present invention is to increase security for card-not-present (CNP) transactions such as online purchases by taking advantage of mobile computing devices' authentication and communication capabilities.

According to one particular embodiment, a customer can use a computing device to be authenticated (either to the device or to a remote server) and receive a unique, one-time token to make a one-click payment during an online checkout process. The one-time token may be encrypted and directly associated with a payment account which the customer is authorized to access. The online merchant may forward a transaction request including the one-time token and purchase amount to an authorization server which would verify the token and charge the corresponding payment account.

According to some embodiments, the customer authentication may take any one or a combination of forms based on information such as personal credentials, hybrid credentials, delegation credentials, biometrics, location, and behavioral data. The customer may be authenticated on or by a mobile computing device which may or may not be further confirmed by a remote server. The customer may be preferably authenticated based on OS-level biometric and/or behavioral data.

According to other embodiments, the customer's mobile computing device preferably maintains a passbook for secure storage of payment account data and/or transaction data. The customer is granted access to the passbook only upon successful authentication. And, the customer may be able to select from the passbook a payment account or funding source for a current transaction during checkout and request the one-time token. Alternatively or additionally, the online checkout process may be redirected to a one-click checkout application or portal where the one-time token data (and all other requisite information) may be auto-filled for the customer.

Additional features and advantages of the invention will be set forth in the description that follows, and in part will be apparent from the description, or may be learned by practice of the invention.

BRIEF DESCRIPTION OF THE DRAWINGS

The accompanying drawings are included to provide a further understanding of the invention and are incorporated in and constitute part of this specification, illustrate several embodiments of the invention and, together with the description, serve to explain the principles of the invention. The purpose and advantages of the present invention will be apparent to those of skill in the art from the following detailed description in conjunction with the appended drawings wherein.

DETAILED DESCRIPTION OF PREFERRED EMBODIMENTS

Figure 1:
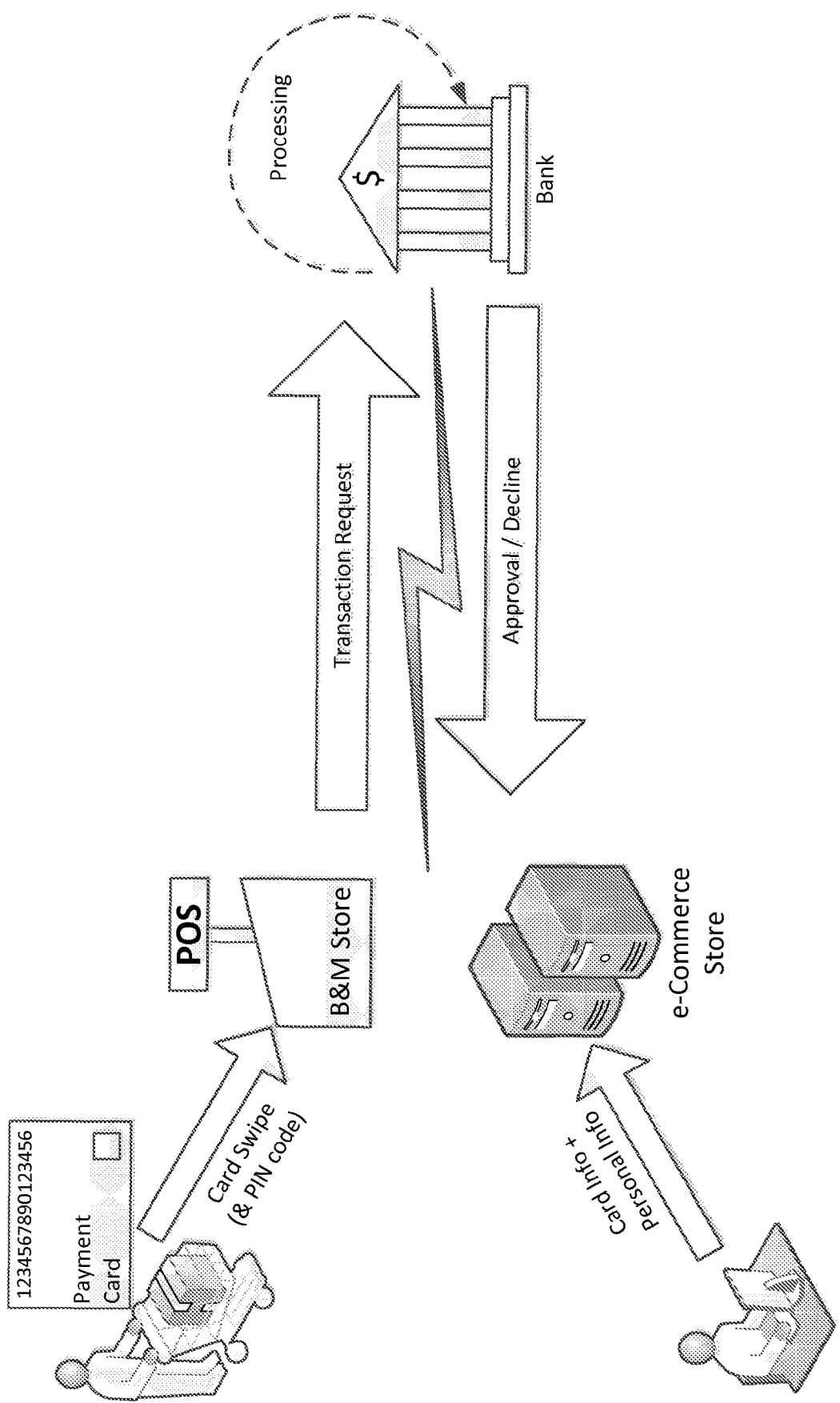
FIG. 1 is a block diagram illustrating prior methods of customer authentication and checkout processes.
Figure 2:
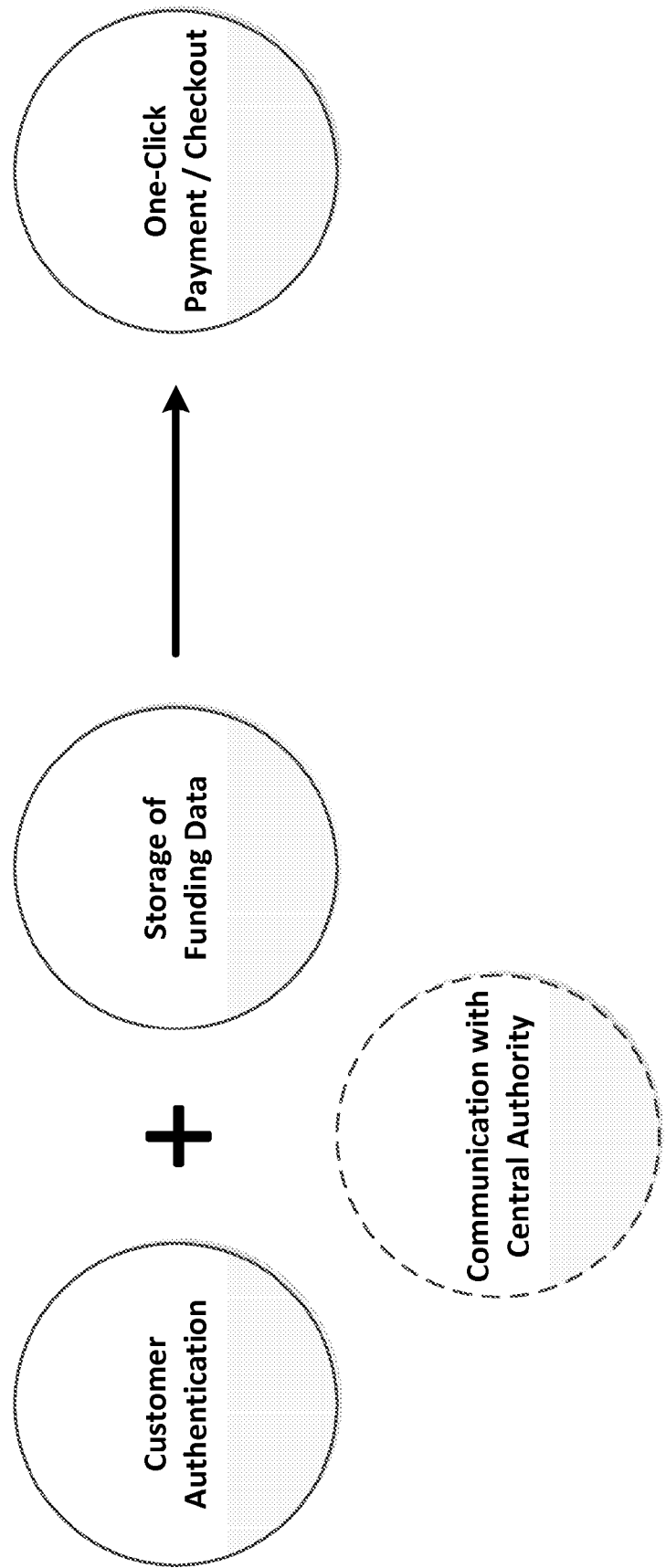
FIG. 2 is a block diagram illustrating components of a one-click payment scheme in accordance with an embodiment of the invention.

As mentioned above, embodiments of the present invention are directed to a so-called "one-click payment" scheme for streamlining customers' online checkout experiences. Customer authentication and storage of funding data are two critical prerequisites to achieve "one-click" payments, as illustrated in FIG. 2.

Customer authentication establishes the true identity of a customer attempting to conduct a transaction, confirming the customer is indeed who he or she claims to be, i.e., an authorized account-holder or cardholder. This authentication requirement may be fulfilled in a number of ways.

Preferably, the customer is authenticated with his or her mobile computing device such as an iOS-based, Android-based, or other type of smart phone device. More preferably, the authentication may take advantage of one or more biometric sensing technologies available on the smart phone devices. For example, some smart phone devices are equipped with a biometric sensor such as a fingerprint scanner. The new Apple iPhone 5S device has embedded in the Home button a fingerprint identity sensor known as "Touch ID." A quick touch on the sensor could reliably confirm the iPhone user's identity and generate OS-level biometric or authentication data usable by a suitable app. Other smart phone devices having a fingerprint scanner include Motorola ATRIX 4G. Apart from smart phone devices, many laptop computers are also equipped with fingerprint scanners which can be used for customer authentication during e-commerce checkouts.

Apart from fingerprint scanning, other types of biometric sensing technologies may also be feasible on a mobile computing device or other personal computing device. For example, almost every smart phone device includes at least one camera which could be used to photograph certain physical attribute(s) of a human body, such as facial features, eyes (retina/iris), ear, or palm and to verify a person's identity based at least in part on such attribute(s). Alternatively or additionally, the audio recording function of a smart phone may be utilized to recognize and distinguish voice signatures of different users for authentication purposes.

Customer authentication may also take advantage of other information such as location, behavior patterns, device information, network connection parameters, personal credentials, delegation credentials, and so on.

For example, the device's GPS location and/or Wi-Fi or cellular network connection points may enhance the confidence of customer authentication. For instance, if the GPS location shows the device user is in or near the accountholder's or cardholder's home or work place (or other places where he or she is known to frequent), or if the network connection shows an IP or MAC address same as a previous address from which the user connected to complete authentication, then it may be concluded that the user is more likely to be who he or she claims to be.

For another example, the presence of a valid cookie or other data indicating a successful login on the Facebook, Twitter, or other social networking or trusted website, if consistent with the customer's purported credentials, may further confirm the customer's identity. To the extent necessary or feasible, the authentication server may simultaneously access one or more of those other social networking or trusted websites to confirm recent access thereto by the customer.

According to certain embodiments of the present invention, the authentication need not always pinpoint a customer's individual identity in every checkout transaction, but may simply confirm the customer belongs to a trusted group of persons.

It is advantageous to rely on a smart phone device for one-click payment/checkout due to a number of reasons. Smart phones are so prevalent these days that people almost never leave home without their beloved hand-held devices. Apart from the above-mentioned various biometric sensing technologies, smart phones also provide secure data storage and communication capabilities that prove valuable to embodiments of the present invention, as explained further below.

In addition to customer authentication, the storage of funding data (e.g., credit cards, funding sources, and address information) is another key requirement for one-click payments. That is, upon authentication, the customer should be able to supply, in an expeditious and secure manner, such information as to how to fund the current transaction or which financial account to access.

Figure 3:
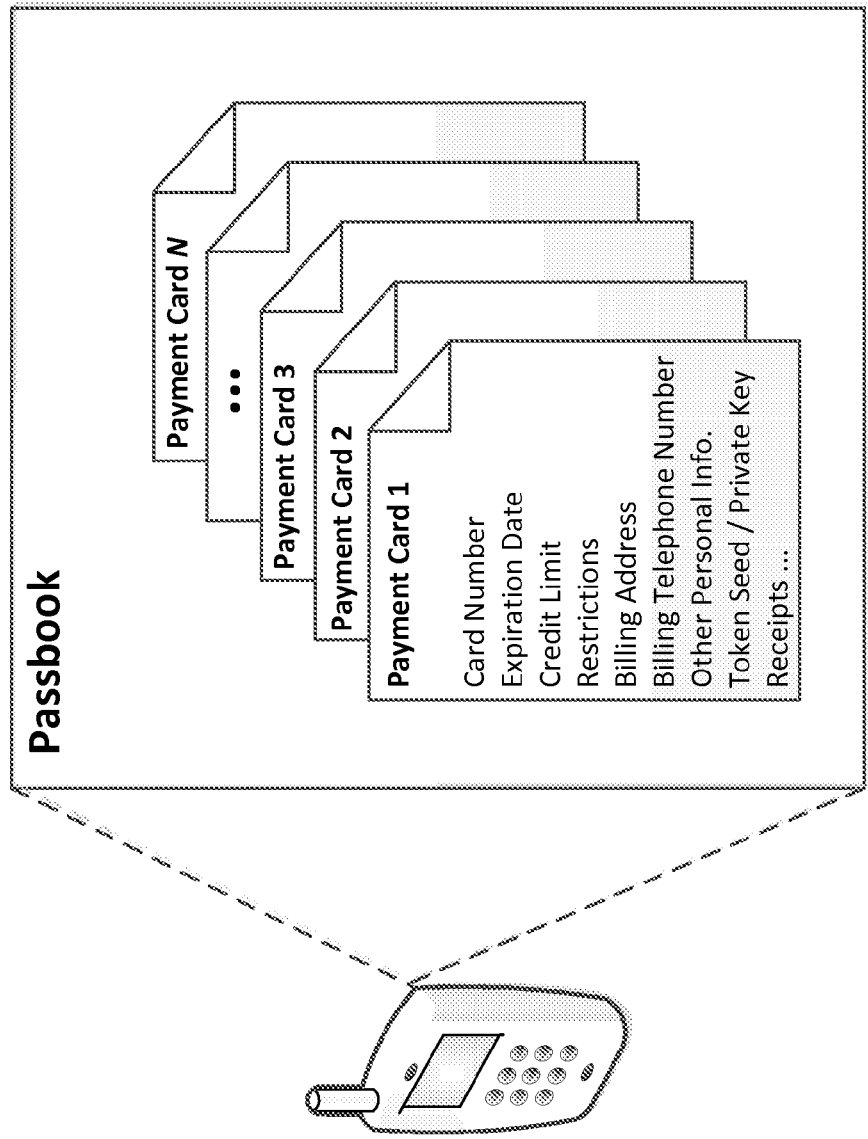
FIG. 3 is a block diagram illustrating an exemplary passbook in accordance with an embodiment of the invention.

One approach to a local secure storage of funding data is through the implementation of a passbook (or electronic wallet). FIG. 3 is a block diagram illustrating an exemplary passbook in accordance with an embodiment of the invention. This passbook may be implemented as a secure (encrypted) data structure or application on a mobile device. The passbook may serve as a data repository to store information related to a plurality of payment cards, accounts, coupons, or other funding sources. For ease of illustration, the exemplary passbook shown in FIG. 3 contains data associated with N different payment cards (N being a positive integer). Each set of funding data corresponding to a payment card may comprise one or more of a card number, an expiration date, credit limit (or remaining credit balance), usage restrictions (if any), billing address, billing telephone number, and/or other personal information. According to some embodiments, the funding data may also include transaction data such as purchase and/or payment receipts. According to other embodiments, the passbook may further include private key(s) or other credentials, which may be passbook/user-specific or card/account-specific, for secure communications with a remote server or other devices. According to embodiments of the present invention, the passbook may be set up in connection with an Internet banking app or card member website.

According to some embodiments, the passbook (e.g., as a mobile app) may provide a user interface for access by its authorized user upon successful authentication. According to other embodiments, the passbook (e.g., as a secure data structure) may be only accessible by certain trusted applications or threads. In both cases, it is preferable for the passbook to be able to communicate with or be updated by another trusted data source such as a remote server of a card issuer.

With both the authentication and the storage requirements met, a one-click payment or checkout procedure may be achieved. In particular, if a communication link can be established with a central authority (e.g., card issuer authorization server or card member database), the one-click scheme may be more satisfactorily implemented, as described in more detail below.

Figure 4:
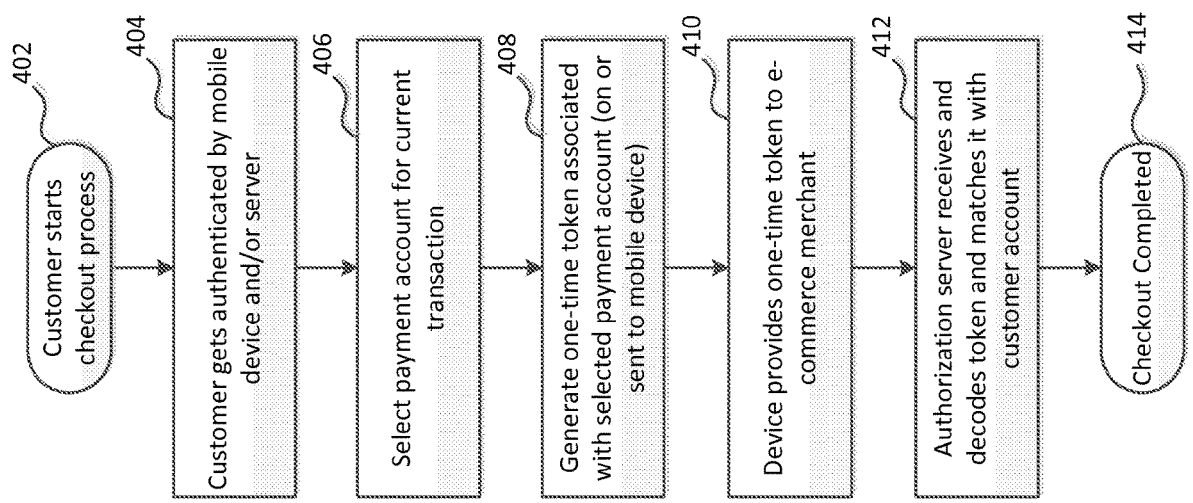
FIG. 4 is a flowchart illustrating an exemplary streamlined checkout process in accordance with an embodiment of the invention.

FIG. 4 is a flowchart illustrating an exemplary streamlined checkout process in accordance with an embodiment of the invention.

In Step 402, a customer may start a checkout process in an online purchase or payment transaction on an e-commerce website. For example, the customer may be purchasing merchandise in an online store such as Amazon.com or Overstock.com. Or, the customer may be making a payment to another individual or company via a web portal. It should be noted that, despite the obvious applicability to online transactions, there is no reason why embodiments of the present invention cannot be used at a physical store or point-of-sale. The customer may be using a computing device such as a smart phone, a tablet computer, a laptop computer, or a desktop computer.

In Step 404, the customer may get authenticated by the computing device and/or a remote server. The authentication may take any of the forms as described above. According to some embodiments, the form of authentication and the level of security may be varied depending on the level of potential risk involved in the contemplated transaction. The higher the risk level, the more stringent the authentication measure.

Figure 7:
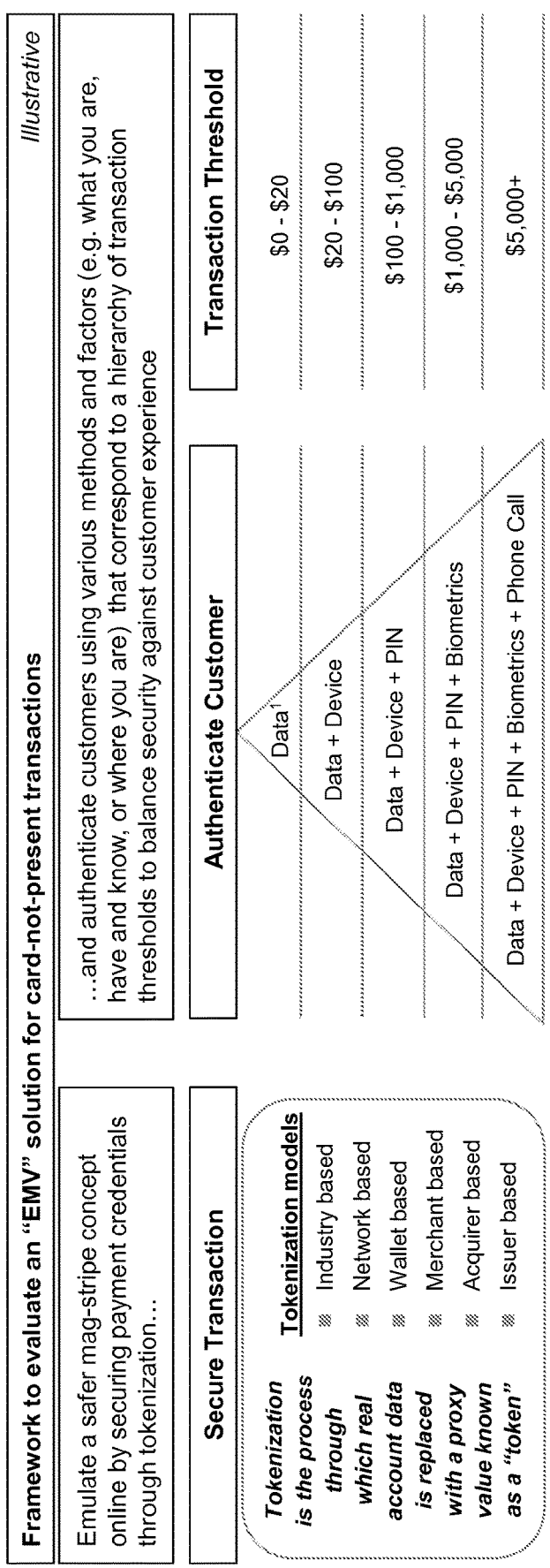
FIG. 7 illustrates an authentication policy adapted to varying levels of transactional risks in accordance with an embodiment of the invention.

FIG. 7 illustrates an authentication policy adapted to varying levels of transactional risks in accordance with an embodiment of the invention. In this example, the transaction amount is used as a proxy for the potential risk level although factors other than transaction amount (e.g., transaction type/terms, transaction location, counterparty identity) can also contribute to the determination of the potential risk level. At the low end of transaction amount (thus low risk), the customer may be authenticated based on data alone such as customer behavior patterns or other personal related information. At the high end of transaction amount (thus high risk), the authentication may require not only the above-described data but also presence of a mobile or payment device, a correct PIN code, biometric match(es), and even a telephone call with an authorization center.

Depending on the level or type of authentication required, the customer identity may be verified either by the customer's computing device alone or by a remote server such as a card issuer's authorization server or by a combination of them.

In Step 406, once authenticated, the customer may be able to select a payment account/card or funding source for the current transaction. For example, the customer may be logged into a passbook on a mobile computing device and can choose one of the stored credit card, debit card, or stored value card to fund an online transaction. Alternatively, the selection may be automated based on pre-programmed preferences or rules (e.g., to maximize rewards points, to always use the Amazon Rewards Visa Card for purchases on Amazon.com, to always use Chase Sapphire Card for all travel-related transactions, and so on). The selection of funding source may also be based on card types, for example, using a credit card in most trusted online stores and using a stored value card having a low balance with less trusted online merchants. It can be appreciated by those skilled in the art that many other selection methods are possible.

In Step 408, a one-time token associated with the selected payment account or card may be generated and made available to the customer and/or the customer's computing device. The token may be a special sequence of numbers, letters, and/or other symbols that uniquely corresponds to (but is not the same as) the account data of a selected funding source. In other words, the token may represent a proxy value of the real account data. For ease of illustration, the following description will take a credit card as the selected funding source.

There may be various options in generating the token (or tokenizing the account data).

According to some embodiments of the present invention, the token may be a number or string derived from the real account data of the credit card based on a secret algorithm only known to the card issuer or merchant acquirer (and optionally the customer's computing device). For example, the token may be a special hash value generated from the credit card number, expiration date, and card holder name, as well as some transaction-specific information such as amount, date, and time. The inclusion of the transaction-specific information may make the token valid only for the specific transaction. The token may be generated either directly from the customer's computing device (e.g., from the account data and/or token seed(s) stored in a passbook) or on a remote server (and then transmitted to the customer's computing device). Since the merchant acquirer and/or card issuer knows the algorithm and can decode the token to recover the real account identifier or account data along with the additional information (or alternatively the device-generated token information could be separately transmitted by the device to the remote server), the token effectively serves as a surrogate of the real credit card for the current transaction.

According to other embodiments of the present invention, the token may be a number or string that is mathematically un-related to (and cannot be derived from) the real account data of the credit card. In this case, the token is preferably generated on a remote server of the merchant acquirer or card issuer that establishes a correlation between the real credit card account and the token, for example, with a matching list or lookup table. As mentioned above, the token may be made transaction-specific and/or time-sensitive. The token may then be transmitted to the customer's computing device, for example, for temporary storage in a passbook.

According to yet another embodiment, the customer's computing device may pre-store a number of one-time tokens that have been generated (e.g., by the remote server, or by the device but shared with the remote server) and associated with the corresponding card(s)/account(s) in advance.

The token or its association with the real credit card may be set to expire within a short period of time (e.g., a few minutes or up to a couple of hours) after generation. There may be other restrictions on the use of the token. For example, the token may be limited to payments to a specific online merchant or those online stores who have passed certain certification or who belong to a merchant group served by a particular acquirer or payment processor. For another example, the token may be limited to a transaction amount up to a preset spending limit. If the transaction amount is greater than the preset limit, the transaction request may be denied or the authorization server may require additional authentication and/or cause an additional token to be generated.

In terms of logistics, the token may be encrypted or at least transmitted in an encrypted form. In addition, the token may include an error-checking mechanism such as checksum characters. To the extent it is generated on the remote server and then delivered to the customer's computing device, the token may be either "pushed" by the server to the device or "pulled" by the device from the server. According to one particular embodiment, the token generation may be automatic, for example, triggered by the customer visiting an online store or placing at least one item into a virtual shopping bag/cart. For instance, a passbook on the customer's computing device may be so triggered into requesting a token in anticipation of an impending checkout/payment. Alternatively, the remote server may periodically push one or more fresh one-time (or limited-time) tokens to the customer's computing device (e.g., for storage in a passbook). According to some embodiments, such one-time (or limited-time) tokens may accompany promotional messages or coupons designed to prompt the customer to shop at certain merchants, and optionally the discount offer(s) or coupon code(s) could be embedded or associated with the tokens and automatically applied during checkout.

Next, in Step 410, the customer or its computing device may provide the one-time token to the e-commerce merchant. According to one embodiment, the token code may be supplied by a passbook app and auto-filled into a checkout form on the e-commerce website. According to another embodiment, the customer may be redirected from the e-commerce website to another web portal that performs the checkout functions including supplying the token code.

In Step 412, the authorization server (of the merchant acquirer or card issuer) may receive and decode (if needed) the token code forwarded from the e-commerce merchant along with the transaction request. According to some embodiments, the authorization server may use a secret algorithm to recover or derive the real account data from the token code. Alternatively, according to other embodiments, the authorization server may match the token with the corresponding credit card account owned by the customer, for example, based on a lookup table maintained by the server. In either case, the real account data of the credit card may be retrieved and any authorized transaction amount can now be charged to the correct account.

Finally, in Step 414, the authorization server may return an approval or denial message to the e-commerce merchant, authorizing the current transaction with the customer, and the online checkout is completed.

From the above description, it may be appreciated that a token is effectively a single-use or limited-time-use virtual payment card that may be generated continuously (periodically) or on demand. In some cases, data of such a temporary virtual payment card is only generated at or around the time of transaction to be funded and valid for a short period of time, reducing the chance of counterfeiting or frauds. Furthermore, the token essentially originates from or is transparent to the same entity (i.e., the authorization server) which both issues and verifies the token, providing more confidence about the identity of the customer and integrity of the data. The generation, transmission and processing of the token may include additional safeguards to ensure it is only issued to an authorized customer and the its content is not tampered with.

Figure 5:
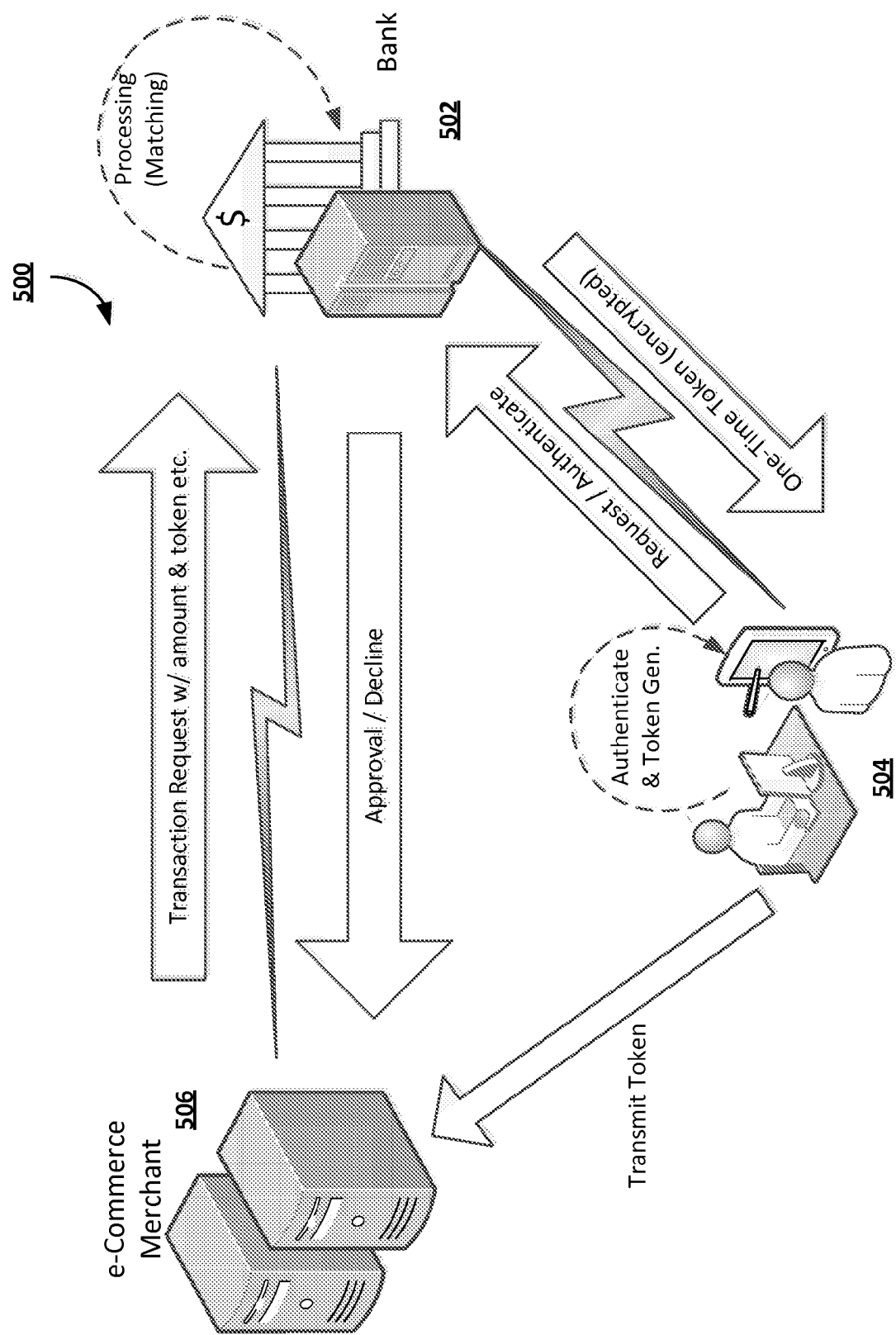
FIG. 5 is a block diagram illustrating an exemplary system for customer authentication in a streamlined checkout process in accordance with an embodiment of the invention.

FIG. 5 is a block diagram illustrating an exemplary system 500 for customer authentication in a streamlined checkout process in accordance with an embodiment of the invention.

As shown, the system 500 is implemented based on computing equipment. Generally, it should be noted that the components depicted and described herein may be, or include, a computer or multiple computers. Although the components are sometimes shown as discrete units, they may be interconnected or combined. The components may be described in the general context of computer-executable instructions, such as program modules, being executed by a computer. Generally, program modules include routines, programs, objects, applications, components, data structures, etc., that perform particular tasks or implement particular abstract data types. For example, a server may comprise a single server or a group of servers used to service users. Additionally, a server may comprise a front-end web server and a back-end database server. Alternatively, those functions can be integrated into a single server device.

Those skilled in the art will appreciate that the invention may be practiced with various computer system configurations, including hand-held wireless devices such as mobile phones, tablets or PDAs, multiprocessor systems, microprocessor-based or programmable consumer electronics, mini-computers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Computing devices (e.g., mobile devices, lap-tops, desktops, etc.) typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or include a variety of operating systems such as the Macintosh® OS or Apple iOS operating systems, Google Android operating system (and variations thereof), Microsoft Windows® operating system (desktop and/or mobile version), the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Apache™ operating system, an OpenStep™ operating system or another operating system or platform.

User applications may be so-called stand-alone applications executing on user devices or they may be client-server type applications that interface with server-side components. They may include applications provided by the server, such as Java Applets, that may be delivered with web pages.

The memory will include at least one set of instructions that is either permanently or temporarily stored. The processor executes the instructions that are stored in order to process data. The set of instructions may include various instructions that perform a particular task or tasks, such as those shown in the appended flowchart. Such a set of instructions for performing a particular task may be characterized as a program, software program, software, engine, module, component, mechanism, or tool. The computer may include a plurality of software processing modules stored in a memory as described herein and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript, for example. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/non-removable, volatile/nonvolatile computer storage media. For example, a hard disk drive may read or write to non-removable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, processor, CPU (Central Processing Unit), programmed micro-processor, micro-controller, peripheral integrated circuit element, a CSIC (Visitor Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It is appreciated that in order to practice the invention as described herein, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described herein is performed by various components and various memories. However, it is appreciated that the processing performed by two distinct components as described herein may, in accordance with a further embodiment of the invention, be performed by a single component. Further, the processing performed by one distinct component as described herein may be performed by two distinct components. In a similar manner, the memory storage performed by two distinct memory portions as described herein may, in accordance with a further embodiment of the invention, be performed by a single memory portion. Further, the memory storage performed by one distinct memory portion as described herein may be performed by two memory portions, for example.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. Input devices include those that recognize hand movements or gestures, such as in the case of gesture set supported by Android or the swipe movements recognized in iOS-based devices. These and other input devices are often connected to the processing unit through a user input interface that is coupled to the system bus, but may be connected by other interface and bus structures, such as a parallel port, game port or a universal serial bus (USB).

A user interface may include any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed herein, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the invention, it is not necessary that a human user actually interact with a user interface used by the processing machine of the invention. Rather, it is also contemplated that the user interface of the invention might interact, i.e., convey and receive information, with another processing machine, rather than a human user. Further, it is contemplated that a user interface utilized in the invention may interact partially with another processing machine or processing machines, while also interacting partially with a human user.

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described herein.

Various networks may be implemented in accordance with embodiments of the invention, including a wired or wireless local area network (LAN) and a wide area network (WAN), the Internet, wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism.

Computers may be connected over the Internet, an Intranet, Extranet, Ethernet, or any other system that provides communications. Some suitable communications protocols may include TCP/IP, UDP, or OSI, for example. For wireless communications, communications protocols may include Bluetooth, Zigbee, IrDa, Wi-Fi, 2G, 3G, Ultra-Wideband and Long Term Evolution (LTE) or other suitable protocols. The wireless communications protocol may also include short-range communications devices and protocols, such as RFID, or Near-Field Communication radio transmissions. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

More specifically, the system 500 may comprise an authorization server 502 operated by or on behalf of a bank functioning as a merchant acquirer or payment card issuer. The authorization server 502 may comprise at least one computer processor, storage media, and communication interfaces. The system 500 may also comprise customer computing devices 504 such as mobile or desktop computers and smart phones. In operation, the a customer computing device 504 may be in communication with an e-commerce merchant's web server(s) 506 to conduct an online transaction and initiate a checkout/payment process. The customer computing device 504 and/or the authorization server 502 may authenticate the customer and cause a one-time token be generated and transmitted to the e-commerce merchant 506 to effect a payment, as described above in connection with FIG. 4. The e-commerce merchant 506 may then send a transaction request with the transaction amount and the token to the authorization server 502. The authorization server 502 may process the transaction request and, in particular, verify the token and match it with a corresponding payment card or account. Upon making a decision about the validity of the token and its applicability to the requested transaction (e.g., whether the token timestamp is timely and whether the transaction amount is within an upper limit preset for the token or underlying account), the authorization server 502 may notify the e-commerce merchant 506 whether its transaction request is approved or declined.

Figure 6:
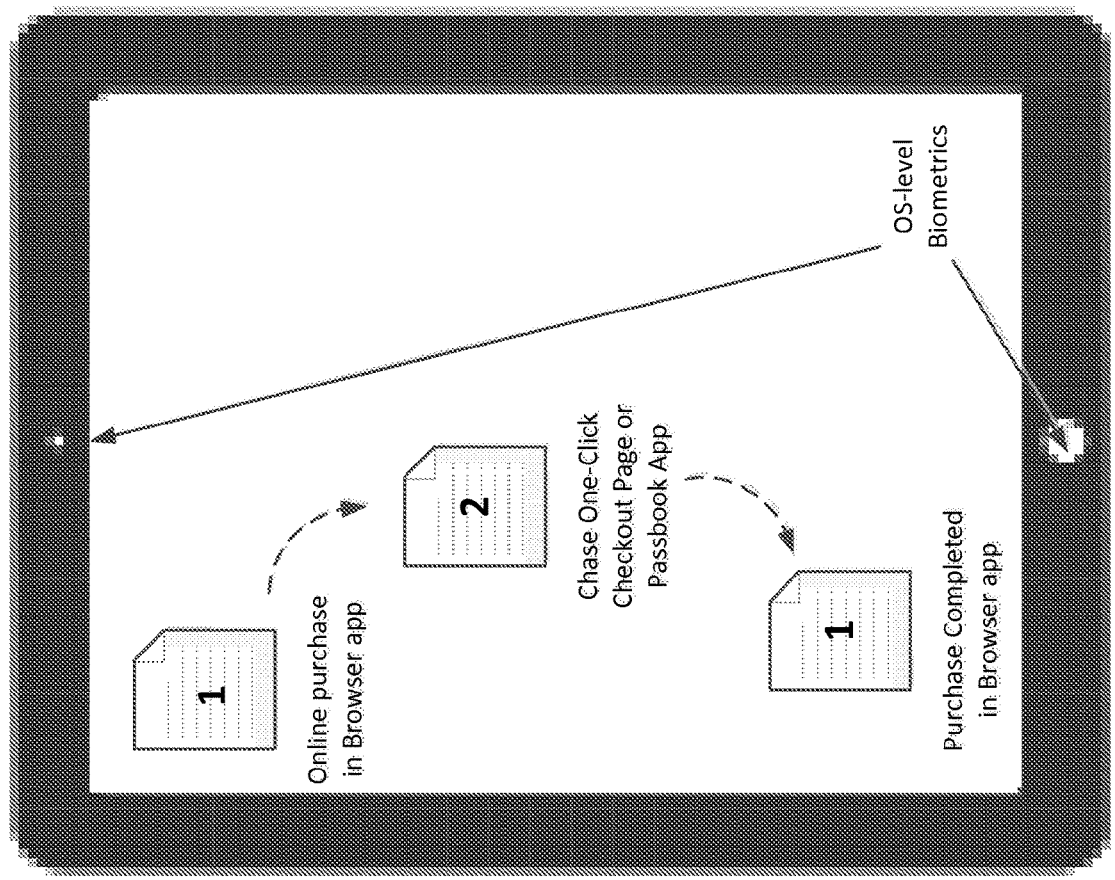
FIG. 6 is a block diagram illustrating an exemplary method of facilitating streamlined checkouts in a mobile computing environment in accordance with an embodiment of the invention.

FIG. 6 is a block diagram illustrating an exemplary method of facilitating streamlined checkouts in a mobile computing environment in accordance with an embodiment of the invention. As shown, the streamlined online purchase and checkout process may be implemented on a mobile computing device such as an Apple iPad, Apple iPhone (not shown), Android smart phone or tablet computer, or the like. An online purchase may be started by a customer in a browser or other similar mobile app. When the customer reaches the checkout/payment stage, the customer may be automatically redirected to a one-click checkout portal hosted by a financial institution (e.g., a card-issuing bank), the example here being a "Chase One-Click Checkout Page," or another mobile app such as a Passbook app may be automatically launched. Such a one-click checkout portal or mobile app may handle the authentication and communications (with the online merchant server and/or authorization server) including token generation and/or transmission needed for a "one-click" checkout experience as described above. Among other things, the customer authentication may take advantage of device capabilities such as OS-level biometrics offered on iPhone 5S. Once the one-click payment is completed with submission of a one-time token to the online merchant, the customer may be automatically directed back to the browser app and the e-commerce webpage.

These examples are merely illustrative and embodiments of the customer authentication or checkout system described herein may be implemented to execute a myriad of customer authentication or checkout interactions. While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A system for facilitating streamlined online checkout, the system comprising:
   a receiver configured to receive a request for payment from a customer in an online transaction between the customer and an online merchant; and
   a processor coupled to the receiver via a communication network, wherein the processor is configured to:
   authenticate the customer upon initiation of a checkout process in the online transaction with the merchant, wherein a form of authentication used to authenticate an identity of the customer varies according to a transaction threshold of the online transaction, wherein the transaction threshold is dependent on at least one characteristic of the transaction;
   identify a customer payment account for use in the online transaction;
   implement an application on said personal computing device that provides a user interface for access by authorized user upon successful biometric authentication or physical attribute authentication and connects to an Internet application to process the customer payment account for use in the online transaction;
   generate a token temporarily associated with the payment account, wherein the token is a hash value generated from real account data;
   make the token available to the customer for submission to the merchant as a form of payment;
   receive a transaction request from the merchant, the transaction request including the token; and
   verify the received token and match the received token to the corresponding payment account, thereby making a decision to approve or decline the transaction request.

2. The system according to claim 1, wherein the processor is configured to cause the token to be generated on a mobile computing device operated by the customer.

3. The system according to claim 1, wherein the token is generated with an algorithm only known to the server computer.

4. The system according to claim 1, wherein the token is generated randomly.

5. The system according to claim 1, wherein the processor is configured to:
   generate the token; and
   transmit the token to a personal computing device operated by the customer.

6. The system according to claim 1, wherein the processor configures the token to expire after a predetermined period of time beyond which its association with the payment account is no longer valid.

7. The system according to claim 1, wherein the token is limited to a transaction with one or more designated merchants.

8. The system according to claim 1, wherein the token is limited to a transaction at or near a GPS location of a mobile computing device operated by the customer.

9. The system according to claim 1, wherein the real account data includes account number, expiration date, account holder name, and transaction-specific information including amount, date, and time of transaction.

10. The system according to claim 1, wherein the processor is configured to:
    pre-generate one or more tokens; and
    transmit the one or more tokens to a personal computing device operated by the customer for at least one future online transaction.

11. The system according to claim 1, wherein the identity of said user is authenticated based at least in part on OS-level biometric or behavioral data.

12. The system according to claim 1, wherein the identity of said user is authenticated based at least in part on a GPS location of said personal computing device.

13. The system according to claim 1, wherein the identity of said user is authenticated based on at least one biometric characteristic or physical attribute of said user.

14. A non-transitory computer readable medium configured to store instructions for facilitating streamlined online checkout, wherein, when executed, the instructions cause a processor to perform the following:

receiving a request for payment from a customer in an online transaction between the customer and an online merchant;

authenticating the customer upon initiation of a checkout process in the online transaction with the merchant, wherein a form of authentication used to authenticate an identity of the customer varies according to a transaction threshold of the online transaction, wherein the transaction threshold is dependent on at least one characteristic of the transaction;

identifying a customer payment account for use in the online transaction;

implementing an application on said personal computing device that provides a user interface for access by authorized user upon successful biometric authentication or physical attribute authentication and connects to an Internet application to process the customer payment account for use in the online transaction;

generating a token temporarily associated with the payment account, wherein the token is a hash value generated from real account data including account number, expiration date, account holder name, and transaction-specific information including amount, date, and time of transaction;

making the token available to the customer for submission to the merchant as a form of payment;

receiving a transaction request from the merchant, the transaction request including the token; and verifying the received token and matching the received token to the corresponding payment account, thereby making a decision to approve or decline the transaction request.

15. The non-transitory computer readable medium according to claim 14, wherein the instructions, when executed, cause the processor to further perform the following:

causing the token to be generated on a mobile computing device operated by the customer.

16. The non-transitory computer readable medium according to claim 14, wherein the instructions, when executed, cause the processor to further perform the following:

generating the token with an algorithm only known to the server computer.

17. The non-transitory computer readable medium according to claim 14, wherein the instructions, when executed, cause the processor to further perform the following:

generating the token in a random manner.

18. The non-transitory computer readable medium according to claim 14, wherein the instructions, when executed, cause the processor to further perform the following:

generating the token; and transmitting the token to a personal computing device operated by the customer.

19. The non-transitory computer readable medium according to claim 14, wherein the instructions, when executed, cause the processor to further perform the following:

configuring the token to expire after a predetermined period of time beyond which its association with the payment account is no longer valid.

20. The non-transitory computer readable medium according to claim 14, wherein the instructions, when executed, cause the processor to further perform the following:

pre-generating one or more tokens; and transmitting the one or more tokens to said personal computing device for at least one future online transaction.

* * * * *